Nov. 27, 1956 H. O. MALCOLM ET AL 2,772,123
APPARATUS FOR PNEUMATICALLY LIFTING GRANULAR CONTACT MATERIAL
Filed March 18, 1952 3 Sheets-Sheet 2

INVENTORS
Harold O. Malcolm
BY William A. Hagerbaumer

Charles A. Huggett
AGENT

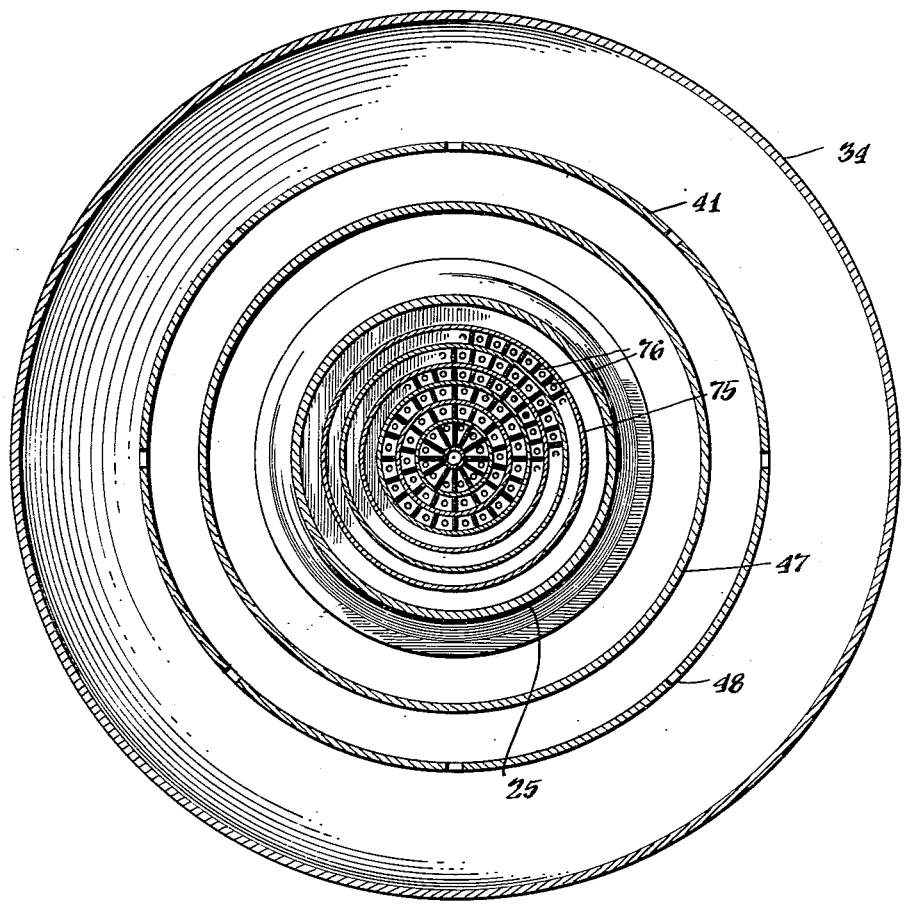

United States Patent Office 2,772,123
Patented Nov. 27, 1956

2,772,123

APPARATUS FOR PNEUMATICALLY LIFTING GRANULAR CONTACT MATERIAL

Harold O. Malcolm, Augusta, Kans., and William A. Hagerbaumer, Westfield, N. J., assignors to Socony Mobil Oil Company, Inc., a corporation of New York Application March 18, 1952, Serial No. 277,122

8 Claims. (Cl. 302—53)

This invention deals with an improved apparatus for pneumatic transfer of granular contact materials from a given location to a higher location. It is particularly concerned with improvement in the engagement of lift gas with the solids at the bottom of a pneumatic lift useful in cyclic hydrocarbon conversion systems of the moving bed type.

The invention may be applied to such processes as catalytic cracking, isomerization, hydrogenation, dehydrogenation, reforming, hydroforming, aromatization, alkylation, cyclicizing, treating and desulfurization of petroleum fractions. Also, the invention may be applied to coking of hydrocarbons in the presence of granular coke or refractory solids, viscosity reducing of petroleum residuums at elevated temperatures, pyrolytic conversion processes such as the conversion of propane and ethane to unsaturated hydrocarbons and of methane to acetylene.

The contact material involved may vary widely in its properties depending upon its use. For catalytic hydrocarbon systems the catalyst may take the form of natural or treated clays, bauxites, inert or active carriers impregnated with certain catalytically active metals or compounds thereof, or synthetic associations of silica, alumina, magnesia, chromia, molybdenum oxide, etc., or combinations thereof to which may be added small amounts of other compounds, usually metallic compounds for specific purposes. When the contact material is employed principally for heat carrying purposes as in pyrolytic conversion processes it may take the form of any of a number of refractory materials such as fused alumina, mullite, Carborundum, zirconium oxide, charcoal, etc., for coking processes the solid material may comprise of a low activity clay catalyst, petroleum coke, pumice or similar materials. The contact material may be in the form of pellets, spheres, tablets, pills or irregular shaped material of palpable particulate form as distinguished from powdered material. It should be understood that the term "granular" as employed herein in describing and claiming this invention is intended to broadly cover any of the above forms of contact material. The contact material involved in this invention may range in size from about 0.005 to 0.5 inch and preferably from about 4-20 mesh by Tyler Standard Screen Analysis. The density of the material as poured into a measuring container may be within the range about 20-130 pounds per cubic foot.

In continuous catalytic cracking systems the contact material is passed cyclically through a conversion zone wherein it contacts a hydrocarbon feed at pressures usually above atmospheric and temperatures of the order of 700-1100° F. whereby the feed is converted and then through a regeneration zone wherein a carbonaceous contaminant deposited on the catalyst in the conversion zone is removed by burning. When the granular catalysts are employed it has been found to be highly desirable to maintain the catalyst as a substantially compact bed or column of gravitating particles in the conversion and regeneration zones. Until recently, continuous bucket elevators were employed exclusively to effect transfer of the catalyst between zones in commercial units. Mechanical elevators have been found to impose certain practical limitations on the overall unit height and on the amount of catalyst circulated. As a result, heretofore all commercial continuous catalytic cracking units of the compact moving bed type have involved side by side arrangement of reactor and kiln thereby requiring two elevators and have involved relatively low catalyst circulation rates. It has been found desirable to increase catalyst circulation rates in order to permit simplification of other parts of the system, particularly the kiln and to arrange the reactor and kiln in vertical series so as to require only a single catalyst transfer step per cycle. This could not be done practically with existing mechanical transfer devices. It had been proposed from time to time to effect the catalyst transfer by pneumatic catalyst transfer lifts but the use of pneumatic transfer in these cyclic conversion systems was prevented because of the very high catalytic attrition and breakage encountered in the pneumatic transfer step, and further because of excessive power requirements. Pneumatic lifts have been developed recently which provide practical pneumatic transfer of the granular contact material in these cyclic conversion systems, in part by delicate control of the gas velocities at various points along the lift. The lifts are disclosed in application for United States Patent Serial Number 210,942, filed February 14, 1951. These lifts involve essentially the use of a continuous vertical lift passage, open at both ends, and with the ends projected into feeding and receiving zones, terminated intermediate the top and bottom of each zone. Contact material is gravitated into the feeding zone at the bottom of the lift as a substantially compact mass and travels downwardly about the lower end of the lift passage. A pneumatic transfer gas is introduced into the zone in two streams, a primary and secondary stream. The primary stream is introduced from a point near the bottom of the lift so as to enter the lift without passing through the mass of compacted material, usually directly beneath the lift. The bottom of the lift is placed as close to the ground as possible to minimize the height of the system structure. The primary gas is brought in parallel to the ground at a location beneath the lift pipe where its direction of flow is changed to vertically upward. The secondary stream is introduced at one or more locations laterally displaced from the centerline of the lift so that it passes through a substantial thickness of the contact material in the feeding zone.

It has been discovered that in lifts of this type a substantial amount of attrition occurs in the lower region of the lift passage, particularly in lifts which are reasonably large in internal diameter. The purpose of this invention is to provide an improved apparatus for introducing the primary gas into the lift to thereby effect a reduction of the attrition of the contact material in the lift.

It is an object of this invention to provide an improved means for lifting contact material pneumatically which provides an effective reduction in the attrition of the contact material.

It is a further object of this invention to provide an improved apparatus for mixing lift gas with solid contact material in pneumatic lifts used to raise contact material in cyclic hydrocarbon conversion systems.

These and other objects of the invention will become apparent from the following description of the invention, to be read in conjunction with the referenced sketches.

Figure 3 is a plan view of Figure 2 as seen on plane 3—3 of Figure 2.

Figure 5 is an enlarged fragmentary view of the screen, as indicated by detail 39 on Figure 2.

Figure 6 is an enlarged fragmentary view of the screen, as indicated by detail 39 on Figure 2.

Figure 1:
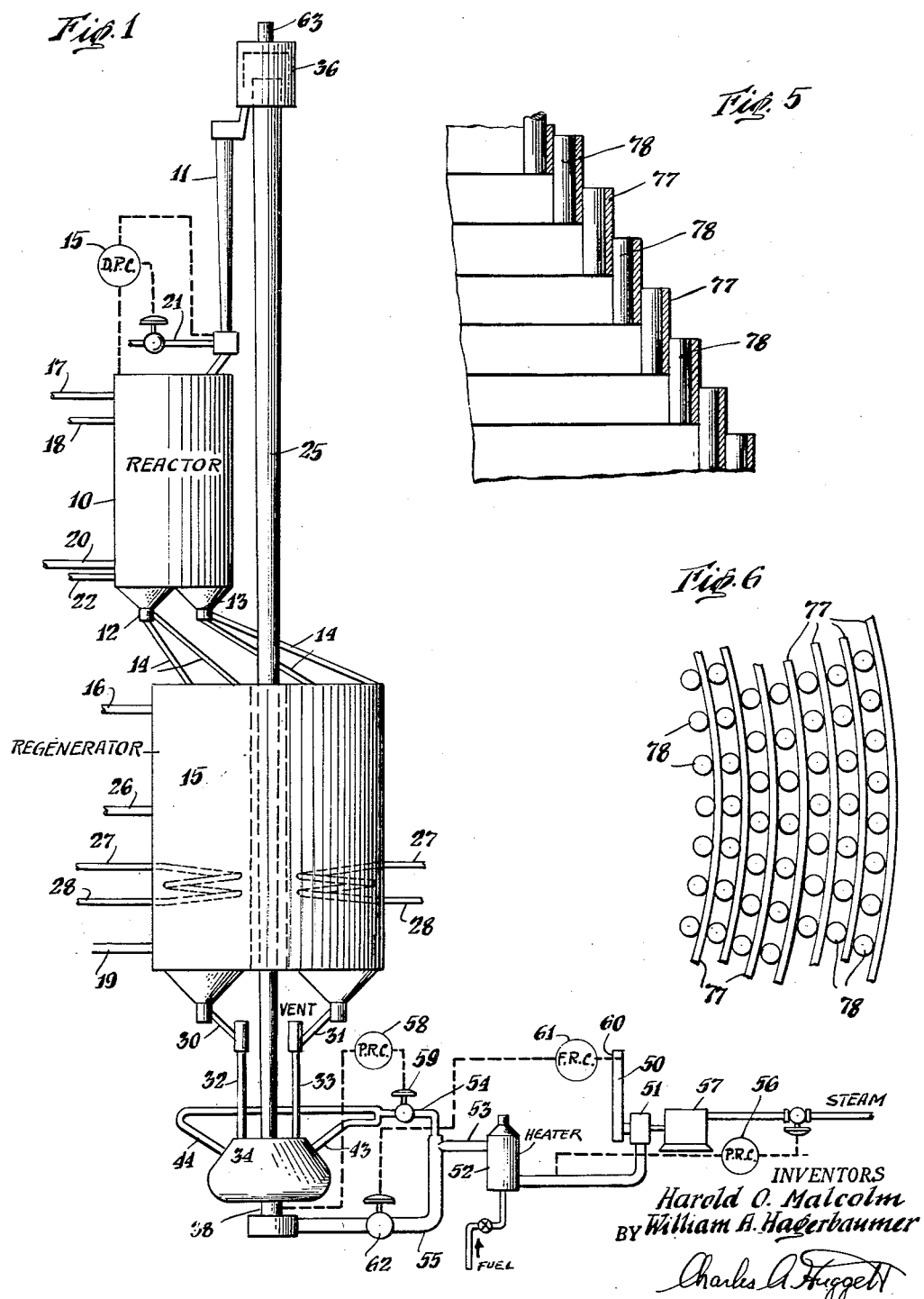
Figure 1 is an elevational view, of a preferred arrangement and application of this invention in a cyclic conversion system.

Turning now to Figure 1, there is shown a typical application of this invention in a cyclic continuous moving bed catalytic cracking process. In the drawing there is shown a reactor 10 which is adapted to confine a moving compact bed of catalyst and which internally may incorporate those features by now well known to the art for accomplishing uniform flow, contacting, engaging and disengaging of the catalyst and reactant. Catalyst enters the reactor through a gravity feed leg 11, which may be of the type disclosed and claimed in United States Patent Number 2,410,309, and catalyst is withdrawn from the reactor via two or more conduits 12 and 13 from which it flows through branch conduits 14 to the upper end of a catalyst regenerator 15. The withdrawal system may be similar to that now disclosed and claimed in United States Patent No. 2,546,625, which issued March 27, 1951. Vaporized hydrocarbon feed, for example, a 500–900° F. gas oil cut, may enter the upper section of the reactor via pipe 17. The feed may be preheated in a heater not shown to a temperature of the order of 700–900° F. A suitable high boiling liquid hydrocarbon feed may be supplied into the reactor via pipe 18, either cold or in preheated condition. The internal liquid feed arrangement may be similar to that disclosed in application Serial Number 719,724, filed in the United States Patent Office on January 2, 1947, now Patent No. 2,574,860, issued November 13, 1951. The cracked lower boiling gaseous hydrocarbon products may be withdrawn from the lower section of the reactor via pipe 20. The internal arrangement associated with pipe 20 may be similar to that disclosed and claimed in United States Patents 2,458,498 and 2,459,096. A suitable inert seal gas such as steam or flue gas may be supplied to an upper seal zone in the reactor via pipe 21. The rate of seal gas supply is maintained by differential pressure controller 15 sufficient to control the pressure in the seal zone slightly above that in the reaction zone proper. Similarly, a seal and purge gas is admitted into the lower section of the reactor via pipe 22 to purge gaseous hydrocarbons from the effluent catalyst. It should be understood that the word "gaseous" as employed herein is intended in a broad sense as covering materials in the gaseous phase under the particular operating conditions involved regardless of what may be the phase of such materials under ordinary atmospheric conditions. The reactor may be operated at a pressure near or somewhat above or below that in the kiln. When the reactor pressure is substantially above that in the kiln it may be desirable to provide a depressurizing zone in the legs 12 and 13.

While the invention is not limited thereto the kiln shown is of annular shape so as to provide a central shaft through which a lift conduit 25 extends. The kiln 15 is provided with a central air inlet 26 and flue gas outlets 16 and 19 adjacent either end. A bank of cooling tubes is provided in the lower section of the kiln supplied with a suitable cooling liquid or gas pipe 27. Cooling fluid leaves these tubes via pipe 28. Suitable internal arrangements for the kiln here shown are disclosed and claimed in application Serial Number 186,953, filed in the United States Patent Office September 27, 1950, now Patent No. 2,695,220, issued November 23, 1954, and Serial Number 186,954, filed in the United States Patent Office September 27, 1950.

The catalyst passes from kiln 15 via two or more pipes 30 and 31 as compact streams delivering onto compact gravity feed legs in pipes 32 and 33, respectively. These legs are vented to the atmosphere on their upper ends, and suitable flow measuring devices may be provided in association therewith.

Figure 2:
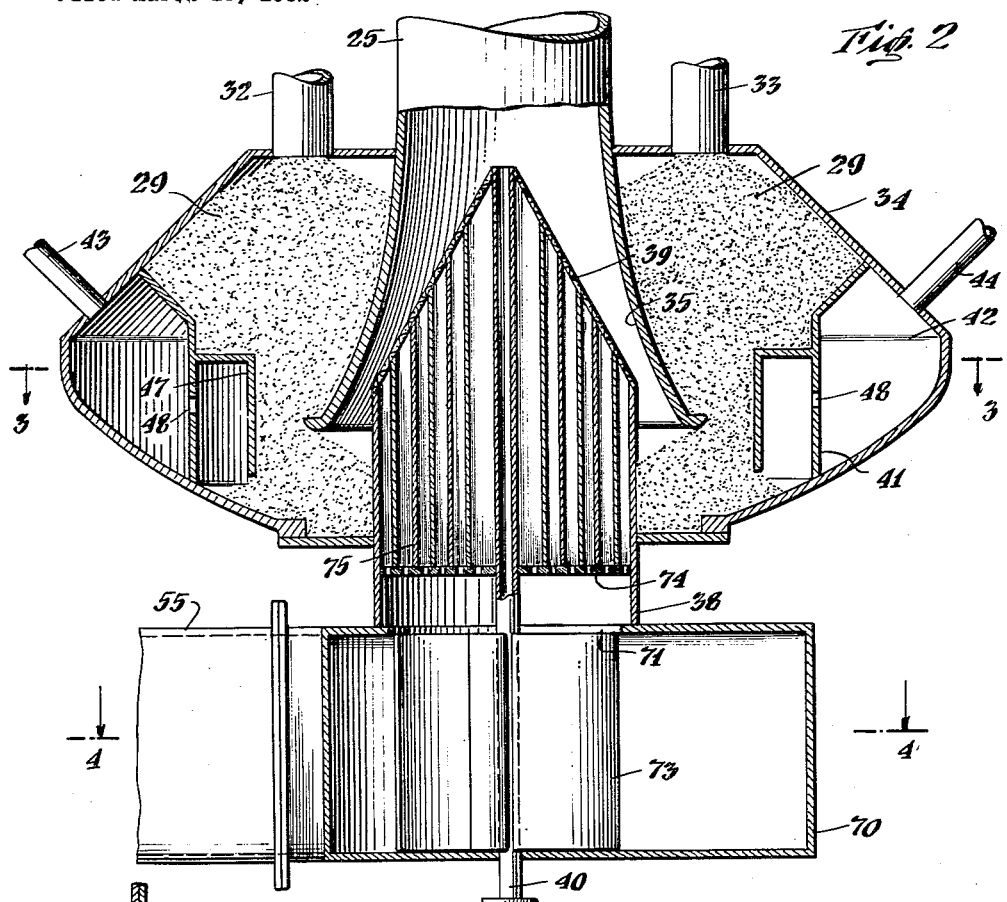
Figure 2 is an elevational view, partially in section, of the lower portion of the pneumatic lift of Figure 1.
Figure 4:
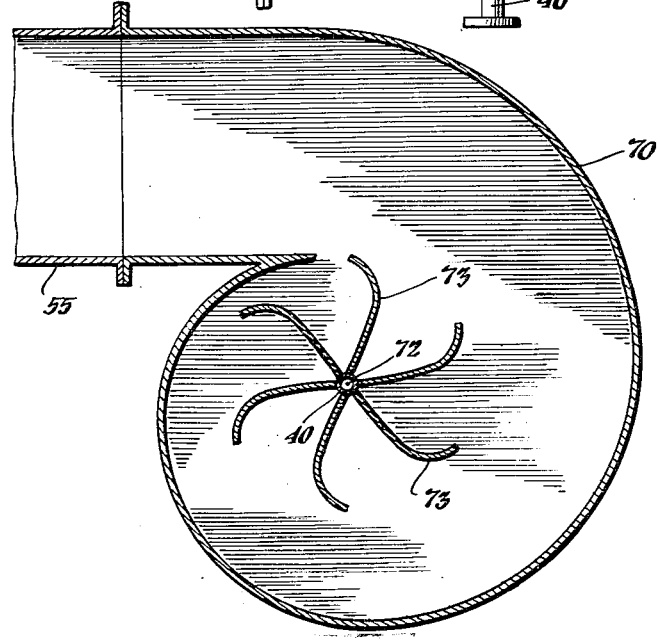
Figure 4 is a plan view of Figure 2 as seen on plane 4—4 of Figure 2.

Referring now in particular to Figures 2, 3 and 4, the catalyst delivers from legs 32 and 33 onto a bed 29 thereof in a lift feed tank 34. A substantially vertical tapered lift pipe 25 extends upwardly from a location within and intermediate the ends of the lift tank 34 to a location within and intermediate the ends of a combination settling-surge vessel 36 which is positioned a substantial distance above the reactor 10. The lower end of the lift pipe may be flared outwardly to form a mouthpiece 35. This mouthpiece is preferably flared outwardly along a curve, approximately a hyperbolic spiral. A detailed view of this mouthpiece is shown on Figure 2. The mouthpiece may be a separate member which is attached to a vertical member to form the assembled lift pipe or may be merely the lower end of a continuous pipe. When the expression "lift passage" is used herein it is meant to include the entire passage from top to bottom including generally a vertical portion and also in preferable designs the curved inlet portion in addition to the vertical portion. The primary gas is introduced directly into the lower end of the lift passage and the catalyst is forced to separately enter the lower end of the passage and mix with the primary lift gas. Preferably the contact material is suspended upwardly from a level below or at least not above the level of primary gas entry. It is also preferred that the mixing of the contact material and primary gas occur below the vertical portion of the lift passage.

A conduit 38 having, if desired, a perforated conical roof 39 located directly below and preferably at least partly within the flared mouthpiece 35 is provided for introduction of primary lift gas substantially directly into the lift passage without the necessity of its flow through any substantial portion of the bed 29. Conduit 40 is a catalyst drain employed only when the unit is shut down. A ring partition 41 is arranged within the feed tank to provide an annular secondary gas plenum chamber 42. Secondary gas is supplied to this plenum chamber via pipes 43 and 44. A downwardly facing ring type angle baffle 47 is provided to form a means for distributing secondary gas into the bed 29. Orifices 48 communicate the plenum chamber 42 with the space under the baffle 47. The secondary gas in order to reach the lift passage must pass through a portion of the feed tank in which there exists a substantial thickness of compact catalyst mass or bed between the distributors 47 and the lower end of the mouthpiece 35. The primary gas is introduced directly into the lower end of the lift passage and the catalyst is forced to separately enter the lower end of the passage and mix with the primary lift gas.

The rate of catalyst entry into the lift can be regulated by control of the rate of secondary gas flow and, when once this is set, the total gas velocity, catalyst velocity and stream density in the lift can be regulated by control of the primary air supply. This method of operation is broadly disclosed and claimed in application Serial Number 76,917, filed in the United States Patent Office February 12, 1949, now Patent No. 2,589,082, issued March 11, 1952. The lift gas, which may be air, steam or flue gas, for example, is drawn through conduit 50 into the blower 51 by which it is forced through line burner 52 wherein it is heated and then via conduit 53 to supply manifolds 54 and 55. The pressure at the blower 51 is maintained constant by pressure regulating controller 56 which controls the speed of the turbine 57. Other things being equal, the pressure at the inlet to the mouthpiece 35 will increase with increasing catalyst through put rates. Hence, by setting the pressure regulating controller 58 at a given pressure the rate of secondary air flow can be maintained substantially constant through actuation of control valve 59 by controller 58. The total rate of gas supply is maintained constant at any desired set value by means of orifice 60, flow regulating controller 61 and control valve 62. Once the controller 61 is set, an increase in secondary air flow is accompanied by an automatic equal decrease in primary air flow. If desired, the preheating of the lift gas may be omitted.

The lift pipe 25 shown is of tapered construction substantially along its entire length, having its greatest cross-section at its upper end. The catalyst separates from the gas in the surge-separation vessel 36 and the gas is withdrawn through the conduit 63. The catalyst settles on a bed in the bottom of the vessel and is withdrawn downwardly, in the form of a susbtantially compact stream, through the feed leg 11 to the reactor 10. Details of a surge-separator, designed to minimize attrition during the settling of the catalyst and also provide a surge zone, are shown in application Serial Number 211,238, filed in the United States on February 11, 1951.

It has been found that if the average gas and catalyst velocities in the pneumatic lift pasage fall below a certain critical minimum which depends upon certain features of the lift pipe, the catalyst attrition will increase very rapidly for even small increments of gas and catalyst velocity decline. On the other hand when the gas and catalyst velocities exceed the critical velocities, the catalyst attrition rate gradually increases but at a substantially lower rate than below the minimum velocity. Details of the required gas and catalyst velocity control for efficient transfer of granular material with minimum attrition through substantially vertical passages are shown and claimed in application Serial Number 210,942, filed in the United States Patent Office on February 14, 1951. It is found that generally the gas and catalyst velocities in the lift passage must be reduced in the upper portion of the lift to prevent attrition in the upper portion of the lift and in the surge-separation zone. This can be accomplished by tapering the lift outwardly from bottom to top. In some instances, however, it is found unnecessary to taper the passage to obtain suitable velocity control. In other instances, velocity control can be obtained by withdrawing gas in controlled amounts at spaced levels along the lift.

Any elevation of the lift pipe above the ground is undesirable because it makes the entire system structure taller. This requires increased amounts of expensive structural steel to provide support and bracing for the taller structure. For this, and other reasons, the bottom of the lift pipe is placed as close to the ground as practicable. The primary gas conduit is brought parallel to the ground to a location beneath the lift pipe and there makes a right angle bend to discharge the gas upwardly into the lift pipe. It is found that his design results in appreciable catalyst attrition in the lift pipe and particularly in the lower portion of the pipe. It has also been discovered that when the design details of a lift of small diameter are transferred to a lift of larger diameter, the attrition is higher than that theoretically calculated. This is believed to be caused, at least in part, by the irregularity of the primary gas velocity across the lower section of the lift passage caused by irregularity in the gas flow. This may cause the gas velocity at a particular location to be above or below the critical, although it is not intended that this invention be restricted to any particular theory.

It has been found that when the primary gas is brought in parallel to the ground through a conduit which is attached tangentially to a volute housing which has a circular outlet in the top coaxial with the center of the spiral, equal gas flow radially into the center circle, representing the entrance area of the lift pipe, is provided. The gas flows upwardly through a short vertical passageway attached about the outlet in the top of the volute housing and is discharged into the bottom of the lift pipe with improved gas distribution pattern. The effect is a substantial decrease in the attrition and markedly improved lift performance.

A preferred embodiment of the invention is shown on Figures 2, 3 and 4. The primary gas pipe 55 is horizontally disposed and connects to the side wall of the volute housing 70. Figure 4 illustrates more clearly how the conduit 55 is attached to the housing tangentially. The opening 71 in the top of the housing is co-axial with the center of the spiral and also the lift pipe 25. Referring to Figure 4, detail 72 indicates the center of the outlet aperture and also an extension of the center line of the lift pipe. The pipe 40 is a drain pipe, used when the unit is shut down to drain catalyst from the lift pipe so that the unit will be ready for starting. The spiral vanes 73 are equally distributed about the centrally located pipe 40 in the volute housing. The design of the vanes in the central circle of the volute embodies the idea of converting the inward velocity of the gas leaving the volute into an approximately uniform static pressure immediately under the discharge conduit 38. The primary gas discharge pipe 38 is shown projected into the lower end of the inlet bell 35, although in some instances it may be located just below the inlet bell 35. Conical screen 39 is located at the top of the conduit 38. An orifice plate 74 is located horizontally across the lower end of the conduit 38. The design of the orifice plate embodies the idea of converting the static pressure, developed under the orifice plate, into a uniform velocity distribution over the area of the lift pipe entrance cone. Above the orifice plate is located a multiplicity of concentric cylindrical straightening vanes 75 and a multiplicity of radial straightening vanes 76. The radial straightening vanes are located between each adjacent pair of cylindrical vanes 75, thereby dividing the cross section into a multiplicity of cells. There is located an orifice opening at the bottom of each cell. The straightening vanes above the orifice plate embody the idea of removing the spiral velocity imparted to the gas stream by the volute wall of the housing and the spiral vanes 73 and directing the gas vertically upward into the entrance bell of the lift pipe on a uniform velocity front.

It is found that when the screen 39 is designed to provide a large number of vertical passageways of small cross section, the attrition of the contact material is reduced and the performance of the lift is thereby improved. The passageways should be so small as to divide the cross section of each cell into a multiplicity of paths. A preferred type of screen, shown on Figures 5 and 6, involves an arrangement of a multiplicity of circular bands 77 of gradually increasing diameter. The bands 77 are arranged concentrically to form a conical shape having an apex angle of approximately 60 degrees. The height of the bands is uniform and small, so as to minimize the resistance to gas flow through the passageways. The bands are interconnected by a multiplicity of spacer bars 78. The spacer bars are located vertically to space adjacent bands. Each bar is connected to the next smaller and larger band at each side. The spacer bars depend approximately equal distances. The bars are uniformly distributed about the circumference of the bands to thereby divide the entire area of the cone shaped structure into a nest of vertical passageways.

*Example*

All illustration of the invention as applied to a commercial lift is given herein. This lift utilizes a tapered lift pipe having a lower frusto-conical portion extending 65% of the length from above the mouthpiece. The diameter of the lift passage is 25.65", 27", 29", 31.7" and 39.3" at the bottom of the frusto-conical portion, 50 feet up, 100 feet up, 150 feet up and 237 feet up (upper end) respectively. The mean diameter is 30.9". The primary and secondary gas feeding arrangement is similar to that shown on the attached figures.

The volute housing has a minimum distance from volute center to the wall of the housing of about 1½ feet and this distance gradually increases to a maximum of about 3 feet 8 inches. The tangentially attached inlet duct is of rectangular cross-section and is about 2 feet 4 inches.

wide by 2 feet 4 inches high. The outlet aperture is circular and has a diameter of about 2 feet 5 inches. The spiral vanes commence radially at the center of the spiral and are bent in a spiral shape to contact the circumference of a circle about 2 feet 7 inches in diameter tangentially. Six spiral vanes are used equally distributed about the center. The discharge conduit is circular, having a diameter of about 2 feet 8 inches. The drain pipe has a diameter of about 2 inches. Five cylindrical vanes are used the smallest having a diameter of about 9 inches and the others being larger in equal increments so that there is a radial clearance between each vane of about 2 inches. A sufficient number of radial straightening vanes is used to divide the annular space between adjacent cylindrical vanes into cells 2 inches by 2 inches in cross-sectional dimensions. The orifice plate has suitably located orifices cut through it so that each cell has a single centrally located orifice. The diameter of the orifices is about 1 inch. The discharge conduit is about 2 feet 5 inches long and projects into the mouthpiece of the lift pipe a distance of about 6 inches. The conical screen, having an apex angle of 60 degrees, is formed as shown on Figures 5 and 6. The mouthpiece of the lift pipe has an internal diameter of about 3 feet 8 inches and the inner wall of the mouthpiece follows a hyperbolic spiral becoming substantially vertical at the bottom of the straight section of the lift pipe.

The invention is not limited to a housing having a wall following a volute curve. For example, in less preferred form the wall of the housing may be circular and substantially concentric with the extension of the center line of the lift pipe. Also the invention is not limited to the use of straightening vanes, an orifice plate or a screen although in preferable form, the invention incorporates all of these features.

It is to be understood that the specific example of apparatus, design and arrangement, and of operation and application of this invention are intended only as illustrative of the invention and it is intended to cover all changes and modifications of the example herein chosen for purposes of disclosure, which do not constitute departure from the spirit and scope of the invention.

I claim:

1. In a pneumatic lift in which a granular contact material is conveyed upwardly through a substantially vertical lift passageway, the improved apparatus for introducing lift gas into the lower end of the passageway which comprises: a gas housing having a generally circular wall, a gas inlet conduit attached tangentially to the wall of said housing, a central vertical discharge conduit attached to the top of said housing, said conduit being substantially coaxial with the lift passageway and terminated near the bottom of said passageway, and means situated between said gas inlet conduit and said vertical lift passageway for effecting removal of the rotary movement from he lift gas due to its introduction into said housing via said tangential gas inlet conduit.

2. In a pneumatic lift in which a granular contact material is conveyed upwardly through a substantially vertical lift passageway, the improved apparatus for introducing lift gas into the lower end of the passageway which comprises: a gas housing having a voluted wall, a gas inlet conduit attached tangentially to said voluted wall, a central vertical discharge conduit attached to the top of said housing, said conduit being substantially coaxial with the lift passageway and terminated near the bottom of said passageway, and means situated between said gas inlet conduit and said vertical lift passageway for effecting removal of the spiral movement from the lift gas due to its introduction into said housing via said tangential gas inlet conduit.

3. In a moving bed hydrocarbon conversion system in which moving beds of granular solid contact material are gravitated through conversion and reconditioning chambers the improved apparatus for effecting transfer of the contact material from one of said contacting chambers to the other which comprises in combination: a lift feed chamber located below one of said contacting chambers, conduit means for flow of contact material from said contacting chamber to the upper section of said feed chamber, a separation chamber having a gas outlet near its upper end positioned at a location elevationally above the other of said contacting chambers, members defining a passageway for contact material flow from the lower section of said separation chamber to said other contacting chamber, a substantially vertical lift conduit, open on its ends, extending upwardly from a location within said feed chamber intermediate its ends to a location within said separation chamber, intermediate the ends thereof, a flared mouthpiece at the lower end of the lift conduit, a gas housing having a voluted wall located below said feed chamber, a primary gas inlet conduit tangentially attached to said voluted wall of said housing, a discharge conduit vertically mounted above said conduit being projected into the bottom of said feed chamber and terminated near the bottom of the lift conduit, means situated between said gas inlet conduit and said vertical lift conduit for effecting removal of the spiral movement from the lift gas due to its introduction into said housing via said tangential gas inlet conduit, conduit means attached to said feed chamber for introducing secondary gas therein and baffle means within said chamber for distributing the gas within said chamber to uniformly spaced discharge points located about the lift conduit and laterally and downwardly from the lower edge of said lift conduit.

4. Improved apparatus for lifting granular contact material comprising in combination: a lift feed tank, conduit means attached to the top of said feed tank, so as to introduce granular contact material therein, a substantially vertical lift pipe, open on its ends and terminated at its lower end intermediate the top and bottom of the feed tank, a horizontally disposed primary gas chamber located beneath the feed tank, a voluted wall on said chamber, a primary gas conduit attached tangentially to said voluted wall, a multiplicity of substantially similar spiral vanes arranged uniformly about the center of said primary gas chamber, so as to direct the gas inwardly from said voluted wall in substantially equal streams, a short discharge conduit mounted vertically above the center of said gas chamber and projected into the bottom of said feed tank, said discharge conduit being terminated near the bottom of the lift pipe, conduit means attached to said lift tank, through which secondary lift gas is introduced into said tank, baffle means within said tank, adapted to direct granular contact material about the lower end of the lift pipe in an annular stream, and orifice means within said tank adapted to introduce secondary lift gas into the region beneath said baffle means so as to enter said annular stream of contact material at a multiplicity of points distributed about the lift pipe, each being located outwardly and downwardly from the lower end of the lift pipe.

5. Improved apparatus for lifting granular contact material comprising in combination: a lift feed tank, means for introducing granular contact material into the top of the tank, a substantially vertical lift pipe projected at its lower end downwardly into the feed tank and terminated at a level intermediate the top and bottom, a flared mouthpiece at the lower end of said lift pipe, a circular baffle within said feed tank adapted to define a secondary gas plenum chamber, said circular baffle possessing orifices distributed in the form of a circle about the lower end of the lift pipe and at substantially equal distances downwardly and outwardly from the lower edge of the lift pipe, a ring-type angle baffle attached to said circular baffle, so as to provide a hood over said orifices, means for introducing secondary lift gas into said plenum chamber, a horizontally disposed primary gas chamber located beneath the lift tank, the center of the chamber being substantially co-axial with the lift pipe, a voluted wall on said chamber, adapted to effect uniform radial gas flow into a center circle, representing the entrance area of the lift pipe, a horizontally disposed gas conduit attached tangentially to said voluted wall, a multiplicity of spiral vanes arranged about the center of said gas chamber, so as to convert the inward velocity of the gas leaving the volute into an approximately uniform static pressure in the center circle, a gas discharge conduit located above the center of the chamber projected upwardly into the mouthpiece of said lift pipe, a substantially horizontal orifice plate in the lower portion of said discharge conduit, a multiplicity of substantially vertical cylindrical and radial straightening vanes, above said orifice plate arranged to divide the cross-section of the discharge conduit into a multiplicity of cells of substantially equal cross-section, each cell containing at least one orifice at the bottom thereof, said straightening vanes adapted to effect removal of the spiral velocity from the gas and direct it vertically upward on a uniform velocity front.

6. Improved apparatus for lifting granular contact material comprising in combination: a substantially vertical lift pipe, a flared mouthpiece at the lower end of said lift pipe, a feed tank attached about the lower end of said lift pipe, means for introducing granular material into the top of the tank, means for introducing a secondary gas into the tank, so as to pass through a substantial thickness of contact material bed in said tank before entering the lift pipe, a voluted housing horizontally disposed beneath the feed tank, the center of the housing being located on the extension of the centerline of the lift pipe, a gas inlet conduit attached tangentially to said voluted housing, a gas discharge conduit attached vertically to the top of the housing and projected upwardly into the flared mouthpiece of the lift pipe within the lift tank, a multiplicity of radially arranged spiral vanes, uniformly distributed about the center of said housing, said housing adapted to effect uniform radial gas flow into the center of said housing and said spiral vanes adapted to convert the inward velocity of the gas leaving the volute into an approximately uniform static pressure beneath the lift pipe, an orifice plate across the bottom of said discharge conduit, adapted to convert the static pressure of the gas to a uniform velocity distribution over the area of the discharge conduit, a multiplicity of substantially vertical cylindrical and radial straightening vanes above the orifice plate, arranged to divide the cross-section of the discharge conduit into a multiplicity of cells of substantially equal cross-section, each cell containing at least one orifice at the bottom thereof, said straightening vanes adapted to effect removal of the spiral velocity from the gas and direct it vertically upward on a uniform velocity front, said vanes terminated in the shape of a cone at the upper end of the discharge conduit, and a conical screen attached to the upper end of said discharge conduit, designed to effect a splitting of the gas stream through each cell into a multitude of smaller streams just prior to the emergence of the gas from said discharge conduit.

7. In a lift of the type herein described, an improved screen comprising in combination: a multiplicity of concentric circular bands, of equal height and terminated at their upper ends in a conical surface, a multiplicity of spacer bars disposed between adjacent bands, the length of the bars being substantially equal or longer than the height of the bands, the thickness of the bars being substantially equal to the radial clearance between adjacent pairs of circular bands, the bars being uniformly spaced about the supporting bands to provide short vertical passageways uniformly distributed across the entire area of the screen.

8. Improved apparatus for lifting granular contact material comprising in combination: a substantially vertical lift pipe, a flared mouthpiece at the lower end of said lift pipe, a feed tank attached about the lower end of said lift pipe, means for introducing granular material into the top of the tank, means for introducing a secondary gas into the tank, so as to pass through a substantial thickness of contact material bed in said tank before entering the lift pipe, a primary gas discharge conduit projected upwardly into the flared mouthpiece of the lift pipe within the lift tank, an orifice plate across the primary gas discharge conduit, adapted to effect uniform distribution of primary gas across the primary gas discharge conduit, a multiplicity of substantially vertical cylindrical and radial straightening vanes above the orifice plate, arranged to divide the cross-section of the discharge conduit into a multiplicity of cells of substantially equal cross-section, each cell containing at least one orifice at the bottom thereof, said vanes adapted to maintain the gas uniformly distributed across the conduit during upward transfer therethrough, said vanes terminated at their upper ends in the shape of a cone which projects upwardly from the upper end of the primary gas discharge conduit, and a conical screen attached to the upper end of said conduit and said vanes, being designed to effect a splitting of the gas stream through each cell into a multitude of smaller streams just prior to the emergence of the gas from said discharge conduit, whereby the primary gas is introduced into the lift pipe uniformly across substantially the entire cross-section of the lift pipe.

References Cited in the file of this patent
UNITED STATES PATENTS

| | | |
|---|---|---|
| 748,893 | Trump | Jan. 5, 1904 |
| 788,741 | Trump | May 2, 1905 |
| 1,390,974 | Von Porat | Sept. 13, 1921 |
| 1,749,817 | Hermsdorf | Mar. 11, 1930 |
| 2,587,670 | Weinrich | Mar. 4, 1952 |
| 2,601,947 | Buttner | July 1, 1952 |